United States Patent
Seidel

(10) Patent No.: US 6,513,240 B1
(45) Date of Patent: Feb. 4, 2003

(54) METHOD OF FORMING A HEAT EXCHANGER STACK

(76) Inventor: Pessach Seidel, 25 Ma'ale HaOren Street, Motza Ilit 90820 (IL)

(*) Notice: Subject to any disclaimer, the term of this patent is extended or adjusted under 35 U.S.C. 154(b) by 0 days.

(21) Appl. No.: 09/727,693

(22) Filed: Dec. 4, 2000

Related U.S. Application Data

(63) Continuation-in-part of application No. PCT/IL99/00293, filed on Jun. 2, 1999.

(30) Foreign Application Priority Data

Jun. 2, 1998 (IL) .................................................. 124723

(51) Int. Cl.[7] ................................................ B23P 15/26
(52) U.S. Cl. .............................. 29/890.039; 29/890.03; 29/419.2
(58) Field of Search .................... 29/890.03, 890.039, 29/428, 419.2; 165/80.3, 185

(56) References Cited

U.S. PATENT DOCUMENTS

| | | | |
|---|---|---|---|
| 5,419,041 A | * 5/1995 | Ozeki | 165/80.3 |
| 5,558,155 A | * 9/1996 | Ito | 165/185 |
| 5,761,811 A | * 6/1998 | Ito | 29/890.039 |
| 5,979,050 A | * 11/1999 | Counterman et al. | 165/10 |
| 6,226,881 B1 | * 5/2001 | Landauer | 33/511 |
| 6,237,222 B1 | * 5/2001 | Chen | 29/890.03 |
| 6,263,956 B1 | * 7/2001 | Tang et al. | 165/80.3 |

* cited by examiner

Primary Examiner—I. Cuda-Rosenbaum
(74) Attorney, Agent, or Firm—Nixon & Vanderhye P.C.

(57) ABSTRACT

A method of forming a heat exchanger stack from a plurality of plates, wherein the plurality of plates includes at least first and second nestable plates formed of an electrically conductive material. Each plate has a generally flat central portion and at least a pair of edge portions generally non-coplanar relative to the respective central portions of the plates. Each plate has a plurality of protrusions which is formed so that, when the plates are in a stacked, nested position, the respective pluralities of protrusions of the first and second plates engage each other, such that the respective central portions of the plates are spaced apart, thereby to define therebetween a space through which a heat exchanging medium may be passed. The method includes placing the first heat exchanging plate on a support, placing the second heat exchanging plate in nesting arrangement with the first heat exchanging plate such that the central portions and the edge portions of the two plates are spaced apart, and exposing at least the edge portions of the second heat exchanging plate to pulsed electromagnetic energy, so as to apply thereto a kinetic force causing the edge portions to bend away from the pulsed electromagnetic energy source, such that they impinge on the respective edge portions of the first plate, so as to become joined thereto.

8 Claims, 2 Drawing Sheets

METHOD OF FORMING A HEAT EXCHANGER STACK

CROSS REFERENCE TO RELATED APPLICATION

This is a continuation-in-part of PCT application PCT/IL99/00293, filed Jun. 2, 1999, the entire content of which is hereby incorporated by reference in this application.

FIELD OF THE INVENTION

The present invention relates to plate heat exchangers generally, and, particularly, to the manufacture thereof.

BACKGROUND OF THE INVENTION

Plate heat exchangers are well known in the art. One example of these is U.S. Pat. No. 5,069,276, to the present inventor, which discloses a plate heat exchanger having a plurality of stacked, substantially flat panels defining between them, in the stacked state, spaces which are formed so as to permit therethrough a flow of a heat exchanging medium. Such stacks may have upturned edges, so as to have a shallow trough-like configuration when viewed in cross-section. It is well known to connect the upturned edges of these plates together by various welding techniques, including brazing.

It will be appreciated, however, that welding together of a stack of heat exchanging plates is very time intensive and, due to the thinness of the plates, can weaken the plates and, in general, cause results which vary in quality. Furthermore, while the edges of adjacent plates may be connected in this manner, it is not possible to connect mid-portions thereof, thereby requiring provision of external mechanical means, such as support rods which extend laterally through the plates and lengthwise through a stack.

SUMMARY OF THE INVENTION

The present invention seeks to provide an improved method of forming a heat exchanger stack, overcoming disadvantages of known art.

There is thus provided, in accordance with a preferred embodiment of the invention, a method of forming a heat exchanger stack from a plurality of plates, wherein the plurality of plates includes at least first and second nestable plates formed of an electrically conductive material, each having a generally flat central portion and at least a pair of edge portions generally non-coplanar relative to the respective central portions of the plates, wherein each plate has a plurality of protrusions which is formed so that, when the plates are in a stacked, nested position, the respective pluralities of protrusions of the first and second plates engage each other, such that the respective central portions of the plates are spaced apart, thereby to define therebetween a space through which a heat exchanging medium may be passed, wherein the method includes:

placing the first heat exchanging plate on a support;

placing the second heat exchanging plate in nesting arrangement with the first heat exchanging plate such that the central portions and the edge portions of the two plates are spaced apart; and exposing at least the edge portions of the second heat exchanging plate to pulsed electromagnetic energy, so as to apply thereto a kinetic force causing the edge portions to bend away from the pulsed electromagnetic energy source, such that they impinge on the respective edge portions of the first plate, so as to become joined thereto.

In a further embodiment, the first heat exchanging plate is placed on a surface of a shaped cavity within the support.

In accordance with an alternative embodiment of the present invention, there is provided a method of forming a heat exchanger stack from a plurality of plates, wherein the plurality of plates includes at least first and second plates formed of an electrically conductive material, each having at least a generally flat central portion and a pair of edge portions, wherein each plate has a plurality of protrusions which is formed so that, when the plates are in a stacked position, the respective pluralities of protrusions of the first and second plates engage each other, such that the respective central portions of the plates are spaced apart, thereby to define therebetween a space through which a heat exchanging medium may be passed, wherein the method includes:

placing the first heat exchanging plate on a support;

placing the second heat exchanging plate in nesting arrangement with the first heat exchanging plate such that the central portions and the edges of the two plates are spaced apart; and exposing at least the central portion of the second heat exchanging plate to pulsed electromagnetic energy, so as to apply thereto a kinetic force causing the protrusions of the second heat exchanging plate to become joined to the protrusions of the first heat exchanging plate.

In a further embodiment, the first heat exchanging plate is placed on a surface of a shaped cavity within the support.

Preferably, the edge portions of the plates are generally non-coplanar relative to the respective central portions of the plates, so as to be nestable, and wherein the method also includes the step of exposing the edge portions of the second heat exchanging plate to pulsed electromagnetic energy, so as to apply thereto a kinetic force causing the edge portions to bend away from the pulsed electromagnetic energy source, such that they impinge on the respective edge portions of the first plate, so as to become joined thereto.

The present invention also provides a heat exchanger stack formed in accordance with the method of the invention.

BRIEF DESCRIPTION OF THE DRAWINGS

The present invention will be more fully understood and appreciated from the following detailed description taken in conjunction with the drawings, in which.

DETAILED DESCRIPTION OF THE INVENTION

Figure 1:
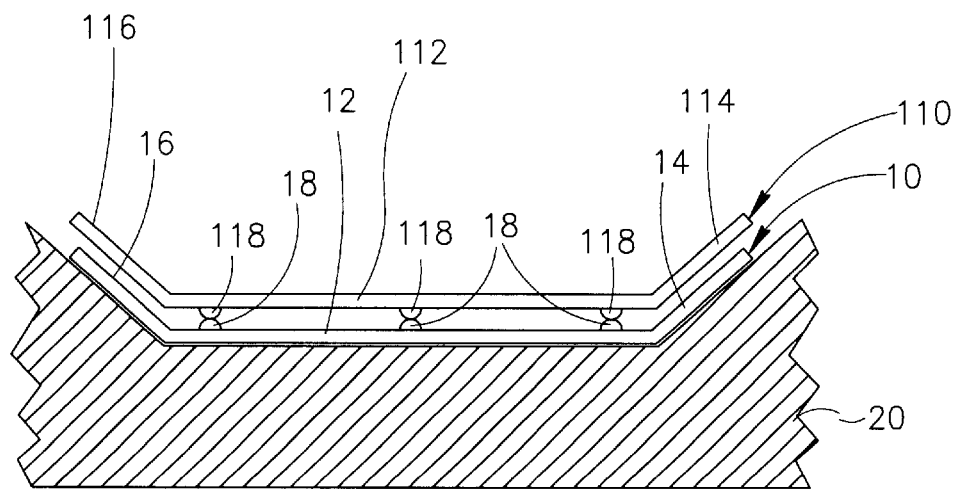
FIG. 1 is a profile view of a pair of heat exchanger plates prior to being joined in accordance with the present invention.

Referring now to FIG. 1, there are shown first and second, generally flat plates 10 and 110, respectively, formed of an electrically conductive material, for forming into a heat exchanger stack, in accordance with the present invention. The plates are generally similar, each having a generally flat central portion 12 and 112, respectively, and upturned edges 14 and 16, and 114 and 116, respectively, so as to have generally trough like configurations, when viewed in profile, and so as to be nestable, as shown. It will be appreciated by persons skilled in the art that a stack formed in accordance with the present invention may be incorporated into a heat exchanger by use of any suitable support means and flow facilitating means, details of which are beyond the scope of the present invention, and thus neither shown nor described herein.

The central portions 12 and 112 preferably have herringbone or other suitable patterns which define protrusions which, when the plates are nested, form therebetween a space for permitting flow therethrough of a heat exchanging fluid medium. More particularly, the herringbone or other similar pattern formed on central portion 12 of plate 10 is represented schematically in the drawings by a plurality of generally upwardly extending protrusions 18 when viewed in profile. Similarly, plate 110 has a plurality of generally downwardly extending protrusions when viewed in profile, represented schematically by protrusions 118, which are seen to be engaged by, and thus supported on, upward protrusions 18.

Figure 2:
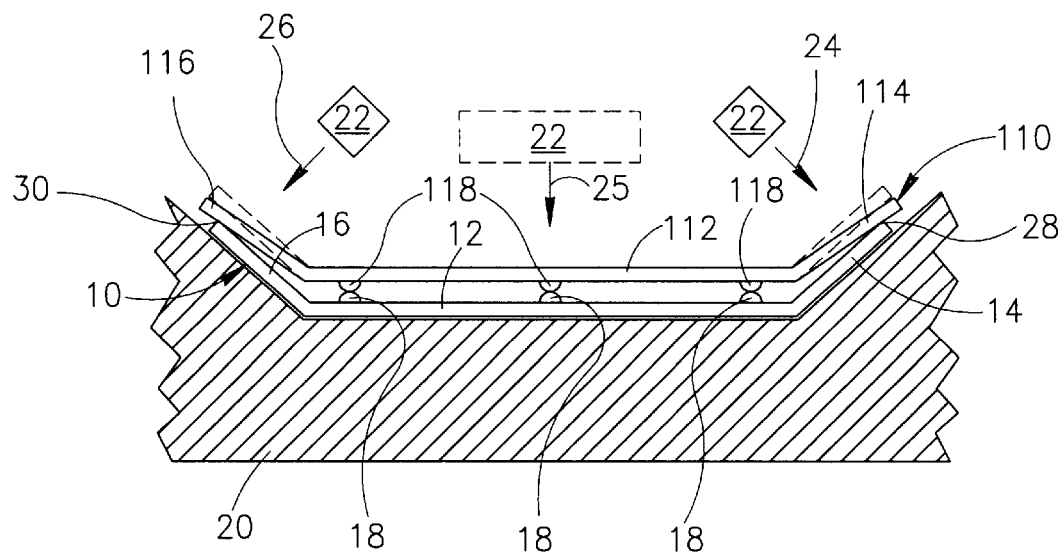
FIG. 2 is a similar view that of FIG. 1, illustrating the method of the present invention.

Referring now also to FIG. 2, in accordance with a preferred embodiment of the present invention, first plate 10 is supported on a fixed support 20, above which is selectably arranged one or more electromagnetic pulse welding devices 22. Devices 22 may be of substantially any suitable construction, such as that described in International Patent Publication No. WO97/22426, entitled Electromagnetic Joining or Welding of Metal Objects, the contents of which are incorporated herein by reference.

As seen in FIG. 1, initially, the upturned edges 114 and 116 of plate 110 are initially generally parallel to respective edges 14 and 16 of plate 10, and, due to the presence of protrusions 18 and 118, edges 114 and 116 are spaced from edges 14 and 16.

Referring now also to FIG. 2, in accordance with a method of the invention, one or more devices 22 are positioned and operated so as to selectably expose upturned edges 114 and 116 to electromagnetic pulses, thereby to cause application thereto of a kinetic force, away from the direction of the electromagnetic energy source. This force causes the upturned edge portions 114 and 116 of plate 110 thereof to bend downwardly, as indicated by respective arrows 24 and 26, from the positions indicated in dashed lines, to those indicated in full lines, so as to impinge on respective edge portions 14 and 16 of plate 10, and so as to become joined thereto, at least at locations 28 and 30.

In accordance with a further embodiment of the invention, device 22 may be positioned and operated so as to additionally or alternatively expose the central portion 112 of plate 110 to electromagnetic pulses, so as to force central portion away from the energy source, as indicated generally by arrow 25, such that the respective pluralities of protrusions 18 and 118 become joined.

Subsequent to the joining of plate 110 to plate 10 in the aforementioned manner, additional plates may be joined thereto in a similar manner, thereby forming a stack of any desired length.

It will be appreciated that joining of the central portions 12 and 112, as described, obviates the need for central supports through a stack of plates formed in this manner.

Figure 3:
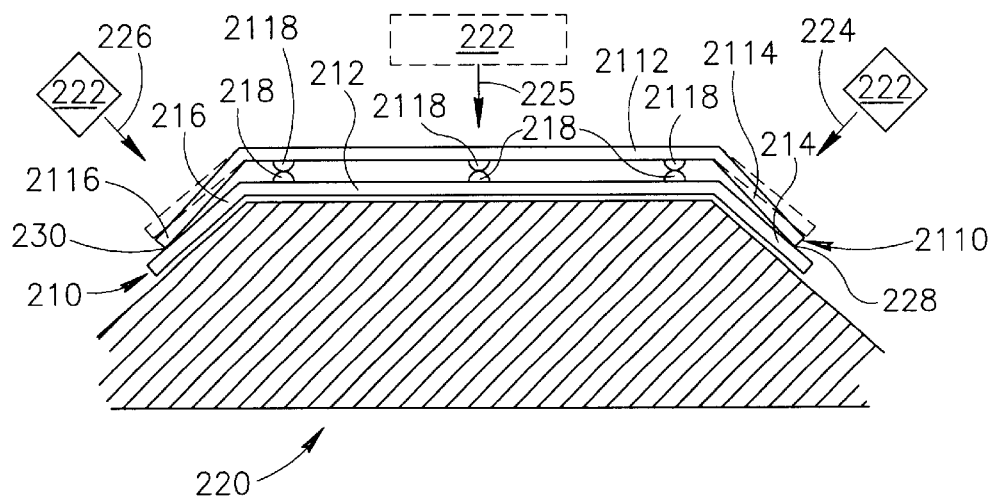
FIG. 3 is a profile view of a further embodiment of the method of the present invention.

Reference is now made to FIG. 3, which illustrates a further embodiment of the present invention. Unlike the previous embodiment where fixed support 20 has a concave upward cavity, the current embodiment includes a solid convex fixed support 220. A plate 210 is formed to fit onto support 220. Plate 210, made of an electrically conductive material, includes a generally flat central portion 212 having a plurality of protrusions 218 on its side distal from support 220. Additionally, plate 210 has two down turned edges 214 and 216 formed to fit along the sides of support 220. The shape of plate 210 is substantially trapezoidal, but other shapes such as substantially rectangular shapes, could also be used.

Nested on plate 210 is an additional plate 2110. Plate 2110 includes a generally flat central portion 2112 with a plurality of protrusions 2118 on its side proximal to plate 210. Protrusions 2118 are in substantial alignment with and abutting protrusions 218 of plate 210. Finally, plate 2110 has substantially down turned edges 2114 and 2116.

As seen in FIG. 3, initially, the down turned edges 2114 and 2116 of plate 2110 are generally parallel to respective edges 214 and 216 of plate 210, and, because of the presence of protrusions 218 and 2118, edges 2114 and 2116 are spaced apart from edges 214 and 216.

In accordance with a method of the invention, one or more electromagnetic pulse welding devices 222 are positioned and operated so as to selectably expose down turned edges 2114 and 2116 to electromagnetic pulses, thereby to cause application thereto of a kinetic force, away from the direction of the electromagnetic energy source. This force, as indicated by respective arrows 224 and 226, causes the down turned edge portions 2114 and 2116 of plate 2110 thereof to bend downward, from the positions indicated in dashed lines, to those indicated in full lines. Edge portions 2114 and 2116 impinge on respective edge portions 214 and 216 of plate 210, so as to become joined thereto, at least at locations 228 and 230.

In accordance with a further embodiment of the invention, electromagnetic welding device 222 may be positioned and operated so as to additionally or alternatively expose the central portion 2112 of plate 2110 to electromagnetic pulses, so as to force central portion 2112 away from the energy source, as indicated generally by arrow 225, such that the respective pluralities of protrusions 218 and 2118 become joined.

Subsequent to joining plate 2110 to plate 210 in the aforementioned manner, additional plates may be joined thereto in a similar manner, thereby forming a stack of any desired length.

It will further be appreciated by persons skilled in the art that the present invention is not limited to what has been shown and described hereinabove by way of example. Rather, the scope of the invention is limited solely by the claims, which follow.

What is claimed is:

1. A method of forming a heat exchanger stack from a plurality of plates, wherein the plurality of plates includes at least first and second nestable plates formed of an electrically conductive material, each having a generally flat central portion and at least a pair of edge portions generally non-coplanar relative to the respective central portion of the plate, wherein each plate is formed so that, when the plates are in a stacked, nested position, the respective central portions of the plates are spaced apart, thereby to define therebetween a space through which a heat exchanging medium may be passed, wherein the method includes:

placing the first heat exchanging plate on a support;

placing the second heat exchanging plate in nesting arrangement with the first heat exchanging plate such that the central portions and the edge portions of the two plates are spaced apart; and exposing at least the edge portions of the second heat exchanging plate to pulsed electromagnetic energy, so as to apply thereto a kinetic force causing the edge portions to bend away from the pulsed electromagnetic energy source, such that they impinge on the respective edge portions of the first plate, so as to become joined thereto.

2. A method according to claim 1 wherein the step of placing the first heat exchanging plate on a support includes placing it in supporting contact with a shaped surface defined by the support.

3. A method according to claim 1 wherein the step of placing the first heat exchanging plate on a support includes placing it in supporting contact with a shaped surface is formed so that, when the plates are in a stacked position, the respective central portions of the plates are spaced apart, thereby to define therebetween a space through which a heat exchanging medium may be passed, wherein the method includes:

placing the first heat exchanging plate on a support;

placing the second heat exchanging plate in nesting arrangement with the first heat exchanging plate such that the central portions and the edge portions of the two plates are spaced apart; and exposing at least the central portion of the second heat exchanging plate to pulsed electromagnetic energy, so as to apply thereto a kinetic force causing the protrusions of the second heat exchanging plate to become joined to the protrusions of the first heat exchanging plate.

4. A method according to claim 3 wherein the step of placing the first heat exchanging plate on a support includes placing it in supporting contact with a shaped surface defined by the support.

5. A method according to claim 3, wherein the pair of edge portions of the plates is generally non-coplanar relative to the respective central portions of the plates, so as to be nestable, and wherein said method also includes the step of exposing the edge portions of the second heat exchanging plate to pulsed electromagnetic energy, so as to apply thereto a kinetic force causing the edge portions to bend away from the pulsed electromagnetic energy source, such that they impinge on the respective edge portions of the first plate, so as to become joined thereto.

6. A method to forming a heat exchanger stack from a plurality of plates, wherein the plurality of plates includes at least first and second nestable plates formed of an electrically conductive material, each having a generally flat central portion and at least a pair of edge portions generally non-coplanar relative to the central portion of the plate, wherein each plate has a plurality of protrusions which is formed so that, when the plates are in a stacked, nested position, the respective pluralities of protrusions of the first and second plates engage each other, such that the respective central portions of the plates are spaced apart, thereby to define therebetween a space through which a heat exchanging medium may be passed, wherein the method includes:

placing the first heat exchanging plate on a support;

placing the second heat exchanging plate in nesting arrangement with the first heat exchanging plate such that the central portions and the edge portions of the two plates are spaced apart; and exposing the edge portions of the second heat exchanging plate to pulsed electromagnetic energy, so as to apply thereto a kinetic force causing the edge portions to bend away from the pulsed electromagnetic energy source, such that they impinge on the respective edge portions of the first plate, so as to become joined thereto; and exposing at least the central portion of the second heat exchanging plate to pulsed electromagnetic energy, so as to apply thereto a kinetic force causing the protrusions of the second heat exchanging plate to become joined to the protrusions of the first heat exchanging plate.

7. A method according to claim 6, wherein the step of placing the first heat exchanging plate on a support includes placing it on a surface of a shaped cavity within the support.

8. A method according to claim 6, wherein the pair of edge portions of the plates is generally non-coplanar relative to the respective central portions of the plates, so as to be nestable.

* * * * *